No. 772,206.
Patented October 11, 1904.

UNITED STATES PATENT OFFICE.

HENRY SPENCER BLACKMORE, OF MOUNT VERNON, NEW YORK.

PROCESS OF MAKING AND SEPARATING ALKALI SALTS FROM INSOLUBLE COMBINATIONS.

SPECIFICATION forming part of Letters Patent No. 772,206, dated October 11, 1904.

Application filed May 8, 1901. Serial No. 59,295. (No specimens.)

*To all whom it may concern:*

Be it known that I, HENRY SPENCER BLACKMORE, a citizen of the United States, residing at 206 South Ninth avenue, in the city of Mount Vernon, county of Westchester, and State of New York, have invented certain new and useful Improvements in Processes of Making and Separating Soluble Alkali Salts from Insoluble Combinations; and I do hereby declare the following to be a full, clear, and exact description of the invention, such as will enable others skilled in the art to which it appertains to make and use the same.

The object of my invention is to transform and separate alkali salts from their insoluble or silicious combination, such as potash from orthoclase, soda from albite, lithia from lepidolite, petalite, or spodumene, &c.; and it consists in subjecting the insoluble combinations containing the alkali to the action of a compound capable of transforming the contained alkali into soluble condition while subjected to hydropneumatic disintegration, as hereinafter set forth, dissolving out the soluble product and crystallizing the same.

In carrying out my invention I will take, for example, the production of lithium carbonates from petalite or lepidolite, (lithia mica.)

I take the petalite or lepidolite, which has been separated more or less from adhering substances or contaminations, and heat it to a low redness in order to thoroughly dry it, then after cooling thoroughly pulverize it. This pulverized mineral is then mixed with water to form a thin paste, the mixture placed in a receptacle, and the pressure decreased, whereby the air is withdrawn. I then subject it to a pressure of about five hundred pounds of gas, such as carbon dioxid, whereby the water is forced into the pores of the pulverized material, thoroughly permeating it. At the same time the water dissolves the carbon dioxid, and the greater the pressure the larger the amount taken up. This carbonic acid or water, supersaturated with carbonic anhydrid, saturates the pulverized mineral, decomposing the lithium or other alkali silicate, producing lithium or other alkali bicarbonate, which dissolves in the excess of liquid and separates from the insoluble residue.

The decomposition is facilitated by adding an equivalent of lime in the form of calcium carbonate to the pulverized mineral, in which case the calcium bicarbonate produced when subjected to a pressure of carbon dioxid dissolves in the carbonated liquid and assists in liberating the alkali from its silicious combination by combining with the silica, producing calcium silicate, and thereby displacing the alkali, which is taken up or dissolved by the excess of liquid pressure. It is obvious that other alkali earths may be substituted for the lime, as herein stated, so long as the alkali is displaced thereby in the presence of the solvent liquid. The action is also augmented by subjecting the mixture of silicious mineral containing alkali and water to the alternating excessive pressure of carbon dioxid and exhaustion, whereby the material becomes thoroughly disintegrated by the hydropneumatic and chemical action of the gases.

After the mixture has been subjected to alternate pressure and exhaustion at intervals for six or eight hours it is allowed to settle and the solution of lithium or other alkali carbonate withdrawn, which after evaporation is obtained in crystalline form.

The water employed to assist in transforming the insoluble alkali compounds treated and dissolve out the soluble alkali salt produced is preferably at a temperature of about 60° Fahrenheit, but may be raised to a higher degree, according to the most favorable conditions for the disintegration of the particular mineral employed.

It is obvious that any insoluble compound containing alkali—such as orthoclase, albite, petalite, lepidolite, spodumene, &c.—may be transformed according to the alkali desired—such as potash, soda, or lithia—and I can employ other reagents for disintegration and transformation by hydropneumatic action, such as sulfurous anhydrid, in which case sulfites of the alkali are formed instead of carbonates. Heat may also be applied, if desired, to facilitate action without departing from the spirit of my invention.

The reactions which take place in formation of soluble lithium salts from compounds containing lithium silicates or fluorids may be illustrated by the following chemical formula or equation, which may be taken as a type of alkali-salt transformation by this process:

$$Li_2SiO_3 + CaH_2(CO_3)_2 = CaSiO_3 + 2LiHCO_3.$$

$$2LiF + CaH_2(CO_3)_2 = CaF_2 + 2LiHCO_3.$$

In many cases the compounds are transformed directly without the addition of alkali earth or other augmenting reagent by action of hydrogen bicarbonate or bisulfite, thus:

$$Li_2SiO_3 + 2HHCO_3 = 2LiHCO_3 + SiO_2 + H_2O.$$

$$Li_2SiO_3 + 2HHSO_3 = 2LiHSO_3 + SiO_2 + H_2O.$$

Insoluble phosphates, fluo-phosphates, and fluorids—such as amblygonite, triphylite, cryolite, and other compounds containing alkali base in insoluble form—can also be employed, as well as silicates, for materials from which to produce and separate soluble alkali salts by the process herein described and are intended to be included and claimed herein as part of my invention. In the above-illustrated chemical formulas or equations the transformation of only the alkali compounds which are contained in the minerals in insoluble form for simplicity are shown, it being unnecessary to include the complicated formula of other ingredients not entering into the reaction.

The term "hydropneumatic" as employed herein relates to the combined action of water and gas at alternately-varying pressures, which has the property of thoroughly saturating and disintegrating the mineral by bringing the reagents in close contact therewith under the conditions described, and the term "augmenting reagent" relates to an assisting reagent or compound for facilitating the decomposition, disintegration, and separation of the mineral.

Having now described my invention, what I claim as new, and desire to secure by Letters Patent, is—

1. The process of making and separating soluble alkali salts from insoluble combinations which consists in subjecting the insoluble material containing alkali compound to hydropneumatic disintegration and transformation by exposing the constituents to applied increased and diminished pressure in the presence of a solvent.

2. The process of making and separating soluble alkali salts from insoluble combinations which consists in subjecting the insoluble material containing alkali compound to the action of water containing a gaseous reagent, and repeatedly exposing the constituents to applied increased and diminished pressure.

3. The process of making and separating soluble alkali salts from insoluble combinations which consists in subjecting the insoluble material containing alkali compound to the action of water and gas under alternately increased and diminished pressures.

4. The process of making and separating soluble alkali salts from insoluble combinations, which consists in subjecting the insoluble material containing alkali compound to the action of water and carbon dioxid under alternately increased and diminished pressures.

5. The process of making and separating soluble alkali salts from insoluble combinations, which consists in subjecting the insoluble material to the action of water and carbon dioxid under alternately super and sub atmospheric pressures.

6. The process of making and separating soluble alkali salts from insoluble combinations, which consists in exposing the comminuted material to the action of water and gas under varying pressures and augmenting the action by supplying thereto a substance capable of displacing the alkali substantially as described.

7. The process of making lithium carbonates from insoluble materials containing lithium compound which consists in exposing the material to the action of water and carbon dioxid under alternately increased and diminished pressure.

8. The process of making lithium carbonates which consists in subjecting comminuted insoluble material containing lithium compound to the action of water, carbon dioxid, and augmenting reagent under superatmospheric pressure.

9. The continuous process of making soluble alkali carbonates from insoluble combinations which consists in mixing the insoluble combinations in a comminuted state with water, subjecting the same to reduced pressure whereby the air is withdrawn, then exposing to an increased pressure of carbon dioxid, and allowing the mineral and water to digest with the carbonic acid while increasing and decreasing the pressure at intervals, withdrawing the soluble alkali salt separated and the residue, adding more water and mineral and continuing the process as before.

In testimony whereof I affix my signature in presence of two witnesses.

HENRY SPENCER BLACKMORE.

Witnesses:
H. N. JENKINS,
FRANK N. GLOVER.